United States Patent [19]

Mori

[11] Patent Number: 4,584,891
[45] Date of Patent: Apr. 29, 1986

[54] POWER SHIFT TRANSMISSION POWER TRAIN HAVING A FORWARD LOW SPEED GEAR TRAIN WITH DUAL REDUCTION GEAR SET MEANS

[75] Inventor: Mitsuyoshi Mori, Hirakata, Japan
[73] Assignee: Kabushiki Kaisha Daikin Seisakusho, Japan
[21] Appl. No.: 541,851
[22] Filed: Oct. 14, 1983
[30] Foreign Application Priority Data Oct. 14, 1982 [JP] Japan ............................... 57-180764

[51] Int. Cl.⁴ ............................................. F16H 3/08
[52] U.S. Cl. ........................................ 74/331; 74/333; 74/359
[58] Field of Search ................ 74/331, 356, 359, 360, 74/333

[56] References Cited

U.S. PATENT DOCUMENTS

| | | | |
|---|---|---|---|
| 2,972,901 | 2/1961 | Gerst | 74/331 X |
| 3,126,752 | 3/1964 | Bolster | 74/331 X |
| 3,916,714 | 11/1975 | Sisson et al. | 74/331 |
| 4,063,464 | 12/1977 | Crabb | 74/331 |
| 4,145,935 | 3/1979 | Herlitzek | 74/331 |
| 4,245,519 | 1/1981 | Herlitzek | 74/331 |
| 4,341,127 | 7/1982 | Stodt | 74/360 X |
| 4,392,391 | 7/1983 | Jameson et al. | 74/331 X |
| 4,461,188 | 7/1984 | Fisher | 74/331 X |

FOREIGN PATENT DOCUMENTS 1541178 2/1979 United Kingdom ............... 74/331

*Primary Examiner*—William F. Pate, III
*Assistant Examiner*—Dwight G. Diehl
*Attorney, Agent, or Firm*—Armstrong, Nikaido, Marmelstein & Kubovcik

[57] ABSTRACT

A power train for a power shift transmission, wherein a first input shaft and a first output on the same axis engaged and disengaged through a forward driving first speed clutch and a second input shaft and a second output shaft on the same axis engaged and disengaged through a forward driving second speed clutch are disposed in parallel with a driving shaft on an engine side; a driving shaft is interconnected through transmission gears to the second input shaft and at the same time the second output shaft are interconnected to the driven shaft side such as an axle etc., both the input shafts are interconnected through a forward driving first speed first reduction gear set, and both the output shafts are interconnected through a forward driving first speed second reduction gear set.

5 Claims, 6 Drawing Figures

FIG. 1 PRIOR ART
FIG. 1a PRIOR ART
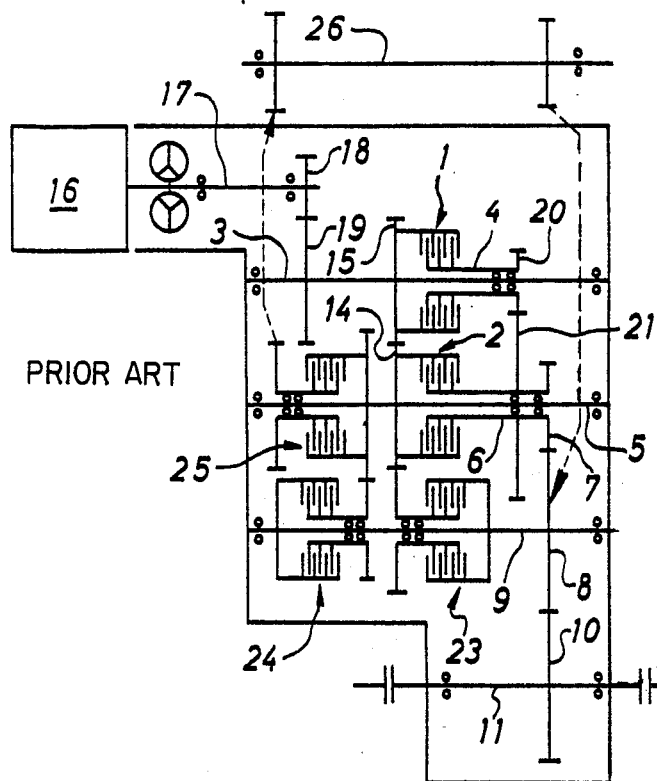
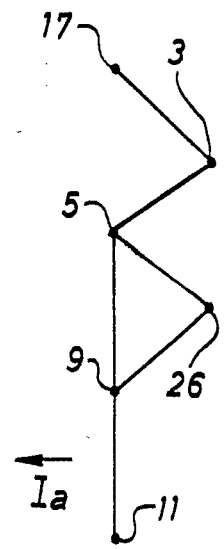
FIG. 2 PRIOR ART
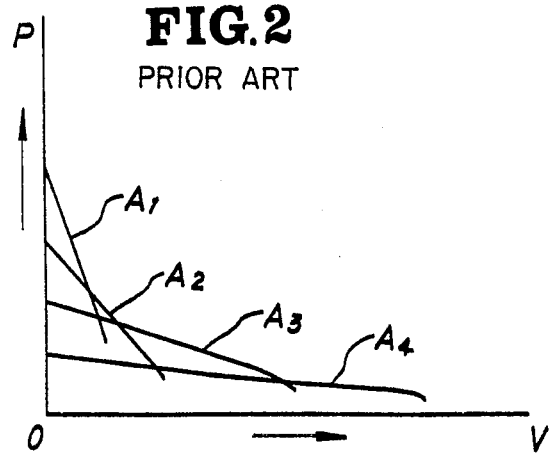

FIG. 3 FIG. 3a
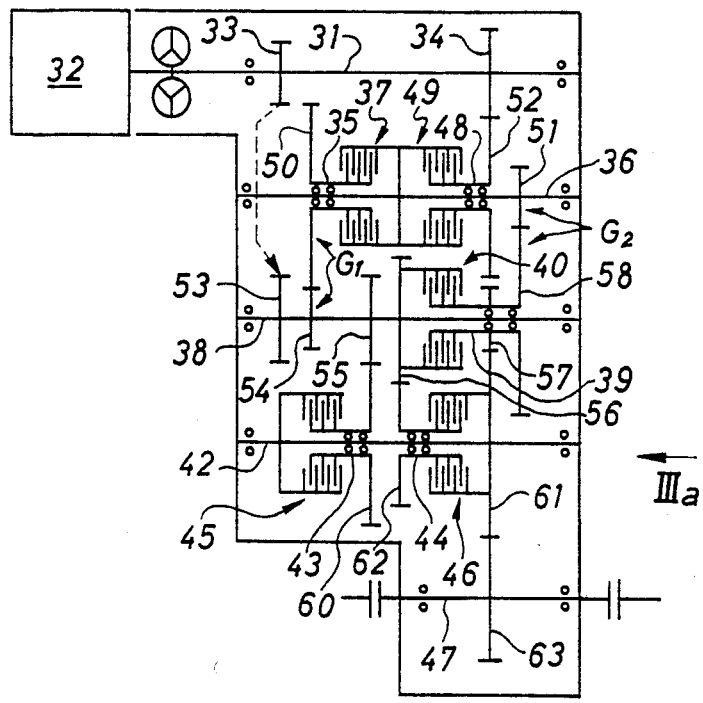
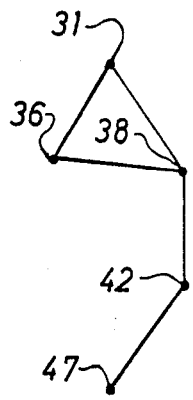
FIG. 4
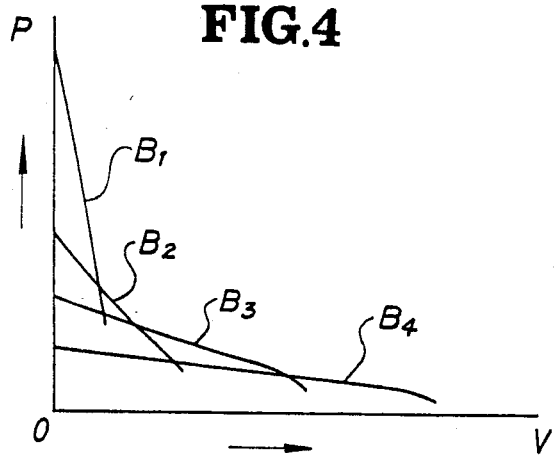

POWER SHIFT TRANSMISSION POWER TRAIN HAVING A FORWARD LOW SPEED GEAR TRAIN WITH DUAL REDUCTION GEAR SET MEANS

BACKGROUND OF THE INVENTION

This invention relates to a power train for a power shift transmission mainly having a rearward driving speed stage and plural forward driving speed stages.

In a work vehicle, for example, such as a truck crane equipped with the above power train, a large tractive force or travelling at ultra-low speed may sometimes be required. However, it has been difficult in a conventional power train to provide, for example, only a forward driving first stage with a large speed reduction ratio in preparation for the above-mentioned case requiring a large tractive force. First of all, a conventional embodiment will be described hereunder according to FIG. 1 which shows a power train having four forward driving stages and one rearward driving stage. In FIG. 1, 1 is a forward driving first speed clutch, and 2 is a forward driving second speed clutch. The forward driving first speed clutch 1 engages a first input shaft 3 for the forward driving first speed with and disengages it from a first output shaft 4 therefor, and the forward driving second speed clutch 2 engages a second input shaft 5 for the forward driving second speed with and disengages it from a second output shaft 6 therefor. The second output shaft 6 is interconnected through a gear 7, a gear 8 (a third output shaft 9) and a gear 10 to a driven shaft 11, and the driven shaft 11 is interconnected, for example, through a differential mechanism to a wheel axle etc. The second input shaft 5 is always interconnected through gears 14, 15 to the first input shaft 3. However, a driving shaft 17 interconnected to an engine 16 is always interconnected through gears 18, 19 to the first input shaft 3, so that a reduction gear set effective only for the forward driving first speed is merely one set consisting of reduction gears 20, 21 installed between the first output shaft 4 and the second output shaft 6. Accordingly, an attempt to make only the reduction ratio of the forward first speed large has been difficult by using only the set of the gears 20, 21 due to limitation of mumber of teeth, etc. 23 is a forward driving third speed clutch, 24 is a forward driving fourth speed clutch, 25 is a rearward driving clutch, and 26 is an idle gear. FIG. 2 is a diagram showing a relation between a travelling speed V and a tractive force P in a conventional embodiment, wherein $A_1$, $A_2$, $A_3$, and $A_4$ show the forward driving first speed, the forward driving second speed, the forward driving third speed, and the forward driving fourth speed respectively. Namely, it will be understood that not only the reduction ratio of the first forward driving speed is especially made large. Incidentally, FIG. 1a is a drawing showing relative positions of each shaft viewing in the direction of the arrow $I_a$ of FIG. 1.

An object of this invention is to make it possible to enlarge a reduction ratio effective only for a forward driving first speed without constructing a power train to a large size.

In order to accomplish the above object, in this invention, a first input shaft and a first output shaft on the same axis engaged and disengaged through a forward driving first speed clutch and a second input shaft and a second output shaft on the same axis engaged and disengaged through a forward driving second speed clutch are disposed in parallel with a driving shaft on an engine side, the driving shaft is interconnected through transmission gears to the second input shaft and at the same time the second output shaft is interconnected to the driven shaft side such as an axle etc., both the input shafts are interconnected through a forward driving first speed first reduction gear set, and both the output shafts are interconnected through the forward driving first speed second reduction gear set.

BRIEF DESCRIPTION OF THE DRAWINGS

FIG. 1 is a drawing of a transmission mechanism showing a conventional power train, FIG. 1a is a drawing showing relative positions of each shaft on FIG. 1, FIG. 2 is a travelling performance diagram of a conventional power train, FIG. 3 is a drawing of a transmission mechanism showing a power train according to the present invention, FIG. 3a is a drawing showing relative positions of each shaft of FIG. 3, and FIG. 4 is a travelling performance diagram of the present invention.

DETAILED DESCRIPTION OF THE INVENTION

FIG. 3 shows an embodiment applied to a power train having forward driving four stages and rearward driving one stage. In this FIG. 3, 31 is a driving shaft interconnected to a crank shaft of an engine 32, and a forward driving gear 33 and a rearward driving gear 34 are fixed to the driving shaft 31. 35 is a first input shaft (hollow shaft), 36 is a first output shaft, and both the shafts 35, 36 are disposed on the same axis and at the same time connected through a forward driving first speed clutch 37 in such a manner as to be freely engaged and disengaged with each other. Further, the first input shaft 35 and the first output shaft 36 are disposed in parallel with the driving shaft 31. 38 is a second input shaft, 39 is a second output shaft (hollow shaft), and both the shafts 38, 39 are disposed on the same axis and at the same time connected through a forward driving second speed clutch 40 in such a manner as to be freely engaged with and disengaged from each other. Furthermore, the second input shaft 38 and the second output shaft 39 are disposed in parallel with the driving shaft 31.

42 is a third output shaft, a third input shaft (hollow shaft) 43 and a fourth input shaft (hollow shaft) 44 fit freely rotatably onto the third output shaft 42, and the third inout shaft 43 and the fourth input shaft 44 can freely be engaged with and disengaged from the third output shaft 42 respectively through the means of a forward driving third speed clutch 45 and a forward fourth clutch 46. The third and fourth input shafts 43, 44 and the third output shaft 42 are disposed in parallel with the driving shaft 31.

47 is a driven shaft interconnected, for example, through a differential mechanism to a wheel axle etc. The driven shaft 47 is disposed parallely with the driving shaft 31.

48 is a rearward driving input shaft (hollow shaft) which fits freely rotatably onto the first output shaft 36 and at the same time can be engaged with and disengaged from the first output shaft 36 through the means of a rearward driving clutch 49.

A forward driving first speed first reduction wheel gear 50 is fixed to the first input shaft 35. A forward driving first speed second reduction pinion gear 51 is fixed to a right end portion of the first output shaft 36 in FIG. 3. A rearward driving input wheel gear 52 is fixed to the rearward driving input shaft 48. To the second input shaft 38, a forward driving input gear 53, a forward driving first speed first reduction pinion gear 54, forward driving third speed pinion gear 55 and a forward driving fourth speed gear 56 are fixed in this order from the left side of FIG. 3. To the second output shaft 39, a pinion gear 57 and a forward driving first speed second reduction wheel gear 58 are fixed in this order from the left side of FIG. 3. To the third input shaft 43, a forward driving third speed input wheel gear 60 is fixed. A wheel gear 61 is fixed to a right end portion of the third putput shaft 42 in FIG. 3. A forward driving fourth speed input gear 62 is fixed to the fourth input shaft 44. A driven gear 63 is fixed to the driven shaft 47.

The forward driving gear 33 on the driving shaft 31 always meshes with the forward driving input gear 53 on the second input shaft 38. The forward driving first speed first reduction pinion gear 54 on the second input shaft 38 always meshes with the forward driving first speed first reduction wheel gear 50 on the first input shaft 35, and both the gears 54, 50 compose a forward driving first speed first reduction gear set $G_1$. The forward driving first speed second reduction pinion gear 51 on the first output shaft 36 always meshes with the forward driving first speed second reduction wheel gear 58 on the second output shaft 39, and both the gears 51, 58 compose a forward driving first speed second reduction gear set $G_2$. Namely, there are provided in the forward travelling two reduction gear sets ($G_1$, $G_2$) effective only for the forward driving first speed.

The pinion gear 57 on the second output shaft 39 meshes with the wheel gear 61 of the third output shaft 42 and the gear 63 of the driven shaft 47, and both the gears 57, 63 compose a reduction gear set effective for the forward driving first speed and the forward driving second speed.

The forward driving third speed pinion gear 55 of the second input shaft 38 meshes with the forward driving third speed input wheel gear 60 on the third input shaft 43, and both the gears 55, 60 compose a reduction gear set effective only for the forward driving third speed.

The forward driving fourth speed gear 56 on the second input shaft 38 meshes with the forward driving fourth speed input gear 62 on the fourth input shaft 44, and both the gears 56, 62 compose a reduction gear set effective only for the forward driving fourth speed.

The rearward driving gear 34 on the driving shaft 31 meshes with the wheel gear 52 on the rearward driving input shaft 48, and both the gears 34, 52 compose a reduction gear set effective only for the rearward driving.

Incidentally, FIG. 3a is a drawing showing relative positions of each shaft viewing in the direction of the arrow $III_a$ of FIG. 3.

In the above-mentioned power train, only the forward driving first speed clutch 37 is turned to ON in order to travel a vehicle at the forward driving first speed. The path of power transmission in this case is as follows:

The engine 32—the driving shaft 31—the forward driving gear 33—the forward driving input gear 53—the second input shaft 38—the forward driving first speed first reduction gear set $G_1$ (gears 54, 50)—the first input shaft 35—the forward driving first speed clutch 37—the first output shaft 36—the forward driving first speed second reduction gear set $G_2$ (gears 51, 58)—the second output shaft 39—the pinion gear 57—the wheel gear 61—the driven gear 63—the driven shaft 47.

In order to travel a vehicle at the forward driving second speed, only the forward driving second speed clutch 40 is turned to ON. The path of power transmission in this case is as follows:

The engine 32—the driving shaft 31—the forward driving gear 33—the forward driving input gear 53—the second input shaft 38—the forward driving second speed clutch 40—the second output shaft 39—the pinion gear 57—the wheel gear 61—the driven wheel gear 63—the driven shaft 47.

In order to travel a vehicle at the forward driving third speed, only the forward driving third speed clutch 45 is turned to ON. The path of power transmission in this case is as follows:

The engine 32—the driving shaft 31—the forward driving gear 33—the forward driving input gear 53—the second input shaft 38—the forward driving third speed pinion gear 55—the forward driving third speed input wheel gear 60—the third input shaft 43—the forward driving third speed clutch 45—the third output shaft 42—the wheel gear 61—the driven gear 63—the driven shaft 47.

In order to travel a vehicle at the forward driving fourth speed, only the forward driving fourth speed clutch 46 is turned to ON. The path of power transmission in this case is as follows:

The engine 32—the driving shaft 31—the forward driving gear 33—the forward driving input gear 53—the second input shaft 38—the forward driving fourth speed gear 56—the forward driving fourth speed input gear 62—the forward driving fourth speed clutch 46—the wheel gear 61—the driven gear 63—the driven shaft 47.

In order to travel a vehicle rearwardly, only the rearward driving clutch 49 is turned to ON. The path of power transmission in this case is as follows:

The engine 32—the driving shaft 31—the rearward driving gear 34—the rearward driving input gear 52—the rearward driving input shaft 48—the rearward driving clutch 49—the first output shaft 36—the forward driving first speed second reduction pinion gear 51—the forward driving first speed second reduction wheel gear 58—the second output shaft 39—the pinion gear 57—the wheel gear 61—the driven gear 63—the driven shaft 47.

FIG. 4 is a diagram showing relations between a travelling speed V and a tractive force P in case of using the power train shown in FIG. 3, and $B_1$, $B_2$, $B_3$, and $B_4$ show those relationships at the forward driving first speed, the forward driving second speed, the forward driving third speed, and the forward driving fourth speed respectively. Two reduction gear sets effective only for the forward driving first speed, that is; the forward driving first speed first reduction gear set $G_1$ composed of the gears 54, 50 (FIG. 3) and the forward driving first speed second gear reduction set $G_2$ composed of the gears 51, 58, are provided in the power train so that only the reduction ratio at the forward driving first speed can be increased by a large margin as shown in FIG. 4.

Incidentally, it is possible in a work vehicle using the power train shown in FIG. 3 that the vehicle is travelled through the forward driving, second, third, and fourth speeds in case of normal travelling, and that it is travelled through the forward driving first speed only when a tractive force is especially required or the vehicle is to be travelled at a low speed.

As mentioned above, in this invention, the first input shaft 35 and the first output shaft 36 on the same axis engaged and disengaged through the forward driving first speed clutch 37 and the second input shaft 38 and the second output shaft 39 on the same axis engaged and disengaged through the forward driving second speed clutch 40 are disposed in parallel with the driving shaft 31 on the side of the engine 32, the driving shaft 31 is interconnected through the transmission gears 33, 53 to the second input shaft 38 and at the same time the second output shaft 39 is interconnected to the driven shaft 47 side such as an axle etc., both the input shafts 38, 35 are interconnected through the forward driving first speed first reduction gear set $G_1$ (pinion gear 54, wheel gear 50), and both the output shafts 36, 39 are interconnected through the forward driving first speed second gear set $G_2$ (pinion gear 51, wheel gear 58). Therefore, the following advantages are obtainable.

(1) Two forward driving first speed reduction gear sets are provided, which are effective only for the forward driving first speed among forward driving speed stages, so that only the reduction ratio of the forward driving first speed can be increased by a large margin. Therefore, especially in case when a tractive force is required or a vehicle is travelled at an ultra low speed, vehicle's tractive ability or its travel performance can be largely improved by utilizing the forward first speed. Further, since reduction ratios for the speed stages of the forward driving second speed and higher are not increased larger than required, a power train having forward driving four speed stages, for example, provides a smooth normal travelling through shifting operation between the second, third, and fourth speed of forward driving.

(2) The driving shaft 31 is interconnected to the second input shaft 38, thus a driving power is transmitted from the second input shaft 38 to the first input shaft 35, the forward driving first speed clutch 37, the first output shaft 36 and the second output shaft 39. Therefore, by utilizing spaces between both the input shafts 38, 35 and both the output shafts 36, 39, two forward driving first speed reduction gear sets $G_1$, $G_2$ can be provided without requiring special countershafts or spaces. Namely, a construction of small size and not so complicated is available although two reduction gear sets effective only for the forward driving first speed are provided. Furthermore, this invention is not limited to the power train having the forward driving four speed stages and the rearward driving one speed stage, but is applicable also to a power train having forward driving three speed stages and rearward driving one speed stage or that having forward driving five speed stages and rearward driving one speed stage.

What is claimed is:

1. A power train for a power shift transmission, comprising:

a hollow first input shaft coaxially and rotatably disposed on a first output shaft on a first axis therewith, said first input shaft and said first output shaft being selectively engaged and disengaged with each other through a forward driving first speed clutch;

a second input shaft and a hollow second output shaft coaxially and rotatably disposed on said second input shaft on a second axis therewith, said second input shaft and said second output shaft being selectively engaged and disengaged with each other through a forward driving second speed clutch;

a driving shaft disposed in parallel relation with said first input shaft, said first output shaft, said second input shaft and said second output shaft, said driving shaft being interconnected through transmission gears to said second input shaft;

a driven shaft directly interconnected through transmission gears with said second output shaft;

a forward driving first speed first reduction gear set interconnecting said first input shaft with said second input shaft; and a forward driving first speed second reduction gear set interconnecting said first output shaft with said second output shaft;

whereby, when said forward driving first speed clutch is engaged so as to engage said first input shaft with said first output shift, driving power may be transmitted from said driving shaft to said driven shaft via said second input shaft interconnected with said driving shaft, said forward driving first speed first reduction gear set interconnecting said first input shaft with said second input shaft, and said forward driving first speed second reduction gear set interconnecting said first output shaft with said second output shaft, such that a first reduction in speed is obtained between said first input shaft and said second input shaft, and a second reduction in speed is obtained between said first output shaft and said second output shaft.

2. A power train for a power shift transmission as set forth in claim 1, further comprising a hollow third input shaft coaxially and rotatably disposed on a third output shaft on a third axis therewith, said third input shaft and said third output shaft being selectively engaged and disengaged with each other through a forward driving third speed clutch and disposed in parallel with said driving shaft, said third input shaft being interconnected through a third speed reduction gear set to said second input shaft and said third output shaft being interconnected through a final gear set to said driven shaft.

3. A power train for a power shift transmission as set forth in claim 2, in which a fourth input shaft is disposed in parallel with the driving shaft, interconnected through a fourth speed reduction gear set to the second input shaft, and at the same time interconnected through a forward driving fourth speed clutch, the third output shaft, and the final gear set to the driven shaft in such a manner as to be freely engaged and disengaged in driving connection therewith.

4. A power train for a power shift transmission as set forth in any one of claims 1 to 3, in which a rearward driving input shaft is coaxially disposed on said first axis with the first output shaft, interconnected through a rearward driving gear set to the driving shaft, and at the same time interconnected through a rearward driving clutch to the first output shaft in such a manner as to be freely engaged and disengaged in driving connection therewith.

5. A power train for a power shift transmission as set forth in claim 4, wherein said forward driving first speed clutch and said rearward driving clutch are formed with a common outer member.

* * * * *